United States Patent
Michenfelder et al.

(12) 
(10) Patent No.: US 6,359,407 B1
(45) Date of Patent: Mar. 19, 2002

(54) WINDSHIELD WIPER DEVICE

(75) Inventors: Gebhard Michenfelder, Lichtenau; Michael May, Offenburg, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/673,915

(22) PCT Filed: Mar. 3, 1999

(86) PCT No.: PCT/DE99/00551

§ 371 Date: Mar. 28, 2001

§ 102(e) Date: Mar. 28, 2001

(87) PCT Pub. No.: WO99/55563

PCT Pub. Date: Nov. 4, 1999

(30) Foreign Application Priority Data

Apr. 23, 1998 (DE) .......................................... 198 18 173

(51) Int. Cl.[7] .................................................. B60S 1/08
(52) U.S. Cl. ................................. 318/443; 318/DIG. 2
(58) Field of Search ................................. 318/443, 444, 318/DIG. 2; 15/250.12, 250.201

(56) References Cited

U.S. PATENT DOCUMENTS

| 4,663,575 | A | * | 5/1987 | Juzswik et al. .............. 318/444 |
| 4,866,357 | A | | 9/1989 | Miller et al. ................. 318/443 |
| 5,822,827 | A | * | 10/1998 | Dimatteo et al. ...... 15/250.203 |
| 5,982,123 | A | * | 11/1999 | Hornung et al. ............. 318/443 |
| 6,150,783 | A | * | 11/2000 | Michenfelder et al. ..... 318/443 |

FOREIGN PATENT DOCUMENTS

| DE | 44 17 371 | 11/1995 |
| DE | 197 00 457 | 2/1998 |
| FR | 2 757 467 | 6/1998 |
| GB | 2311208 | 9/1997 |
| JP | 57 198 146 | 12/1982 |

* cited by examiner

Primary Examiner—Bentsu Ro
(74) Attorney, Agent, or Firm—Kenyon & Kenyon

(57) ABSTRACT

A windshield wiper mechanism has an electric motor which, subject to a trigger signal of a control circuit, drives a wiping system having at least one wiping space. A consistent wiping sweep is obtained due to the control circuit having a control stage for changing the trigger signal as a function of a wind load.

5 Claims, 1 Drawing Sheet

WINDSHIELD WIPER DEVICE

FIELD OF THE INVENTION

The present invention relates to a windshield wiper mechanism having an electric motor which, subject to a trigger signal of a control circuit, drives a wiping system having at least one wiping space.

BACKGROUND AND INFORMATION

A windshield wiper mechanism of this type is described in German Published Patent Application No. 4417371. In this known windshield wiper device, an electric motor driving the wiping system via the wiper arm is operated subject to a trigger signal of a control circuit. The control circuit is designed in such a way that the specified wiping angle tolerances in the area of the end positions of the wiper arm are maintained largely independently of the movement energy of the windshield wiper. A still unsolved problem is that the wiping sweep is frequently irregular during travel, varying speeds of the wiper arm occurring during the upward and downward movement in particular.

SUMMARY OF THE INVENTION

The object of the present invention is to provide a windshield wiper mechanism of the aforementioned type in which a wiping sweep which is as consistent as possible is maintained corresponding to a specified wiping speed stage.

According to the present invention, the control circuit has a control stage for changing the trigger signal as a function of a wind load. The additional provision of the control stage having the property that the trigger signal is changed as a function of a wind load causes the upward movement of the wiper to be decelerated to the degree essentially corresponding to the set wiping speed for a relatively high speed in particular and the speed of the downward movement to be essentially brought to the setpoint value, resulting in a consistent wiping sweep that does not disturb the driver. In addition, a desired maximum deflection position is always maintained, as a result of which an optimum wiping field is always maintained.

Without special sensors for directly detecting the wind load (which is also possible), it is possible to specify it with good results in a simple manner by determining the wind load from the vehicle speed and/or the wiper speed, the wind load values being stored in a memory or continuously being recalculated. In addition, the vehicle speed can be supplied simply by obtaining it from a speedometer signal while the wiper speed is determined from a contact disk which is present in any case to generate an absolute position signal and/or a signal picked off from a Hall-effect switch which is also present in any case for a relative position signal.

In contrast to a conventional control circuit, the trigger signal may be supplied at low expense, for example, by forming it from a manipulated variable signal produced by a manipulated variable generator or a controller.

In order to smooth the wiper speed in both wiping directions as well as possible, the measures that the trigger signal is intensified as a function of the wind load during downward movement of the wiper arm and reduced during upward movement of the wiper arm are also advantageous. In this connection, a decelerating effect may also be produced via the trigger signal during the upward movement if necessary.

If the trigger signal is provided as a pulse-width modulated signal, then the trigger signal can be easily manipulated by changing the pulse width via the correction signal as a function of the wind load

DETAILED DESCRIPTION

Figure 1:
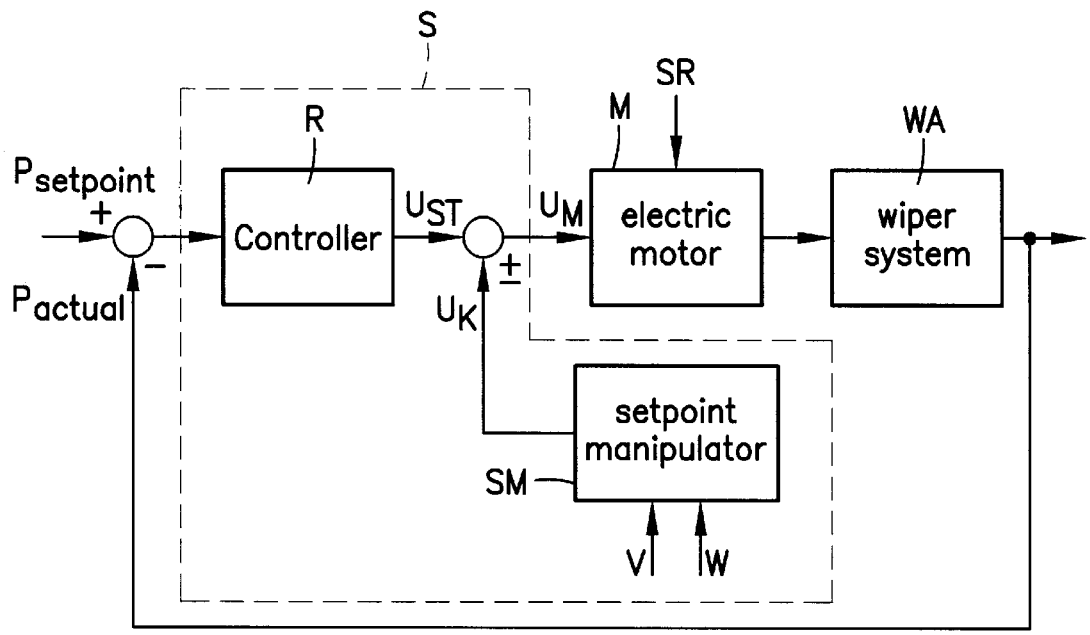
FIG. 1 shows a windshield wiper mechanism in schematic form with a controlled activation system.

The windshield wiper mechanism shown schematically in FIG. 1 has a controller R, an electric motor M, a wiper system WA, which essentially includes the moved mechanical elements, and a control stage embodied as a setpoint manipulator SM.

A manipulated variable signal $U_{ST}$ in the from of a voltage and/or current signal is generated in controller R with consideration of a control deviation formed during the wiping sweep at short time intervals from a setpoint position $P_{setpoint}$ and a detected actual position $P_{actual}$. Manipulated variable signal $U_{ST}$ is changed via a correction signal $U_K$ which is supplied by the control stage in the form of a setpoint manipulator SM. The manipulated control variable forms a trigger signal $U_M$, but also a voltage and/or a current signal, of electric motor M. External disturbance variables can act on electric motor M. Actual position $P_{actual}$ of wiper system WA driven by electric motor M is returned to the input of controller R as an actual value for forming the control deviation.

Values corresponding to a particular wind load are generated in Setpoint manipulator SM or stored in a table in order to form correction signal $U_K$ from them. Since the values of the wind load correlate closely with a particular vehicle speed v and/or a wiper speed w, vehicle speed v and/or wiper speed w can also be used directly to calculate or store the wind load values. The present vehicle speed v is preferably obtained from a speedometer signal which is present in any case while wiper speed w is obtained from an existing contact disk, which is conventionally used to form an absolute signal of the wiper position, and/or from relative position signals of a Hall-effect switch or a corresponding position sensor. Correction signal $U_K$ formed in control stage SM is added to manipulated variable signal $U_{ST}$ to support the downward movement of the wiper arm against the wind load while correction signal $U_K$, with which the upward movement of the wiper which is accelerated by the wind load, is subtracted in order to generate a reduced trigger signal $U_M$. If necessary, a decelerating effect may also be obtained.

As a new trigger signal, enlarged or reduced manipulated variable signal $U_{ST}$ is able to effectively correct the wiper movement corresponding to the selected speed stage in contrast to manipulated variable signal $U_{ST}$, resulting in a consistent wiping pattern practically without any difference during the upward and downward movement.

Figure 2:
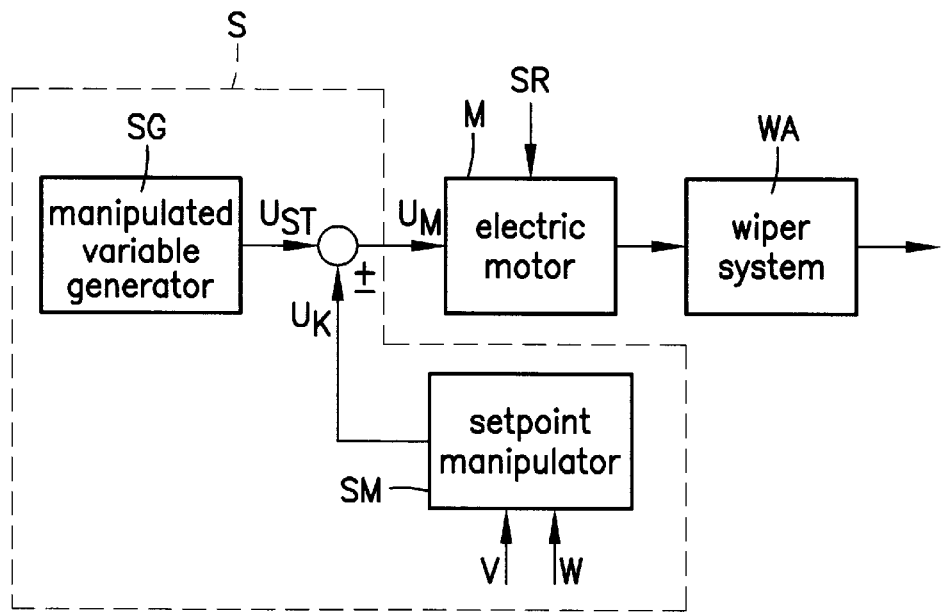
FIG. 2 shows a windshield wiper mechanism in schematic form with a control system without position control.

A manipulation of manipulated variable signal $U_{ST}$ corresponding to FIG. 1 is depicted in FIG. 2. In this case, however, the control system is formed overall as a simple system without position control, controller R specified in FIG. 1 being replaced by a manipulated variable generator SG. With regard to the manipulation of manipulated variable signal $U_{ST}$ using correction signal $U_K$ and the generation of correction signal $U_K$ and the formation of trigger signal $U_M$, control circuit S corresponds to that of FIG. 1.

A pulse-width modulated signal is particularly suitable as trigger signal $U_M$ of electric motor M, the pulse width of manipulated variable signal $U_{ST}$ under wind load being reduced during the upward movement and enlarged during the upward movement by correction signal $U_K$.

Signals provided by other suitable sensors may also be used as a variable for the wind load.

What is claimed is:

1. A windshield wiper mechanism, comprising:
   a control circuit for providing a trigger signal and including a control stage for changing the trigger signal as a function of a wind load;
   a wiping system including at least one wiping space; and
   an electric motor for driving, subject to the trigger signal, the wiping system, wherein:
      the trigger signal is intensified with a downward movement of a wiper arm as a function of the wind load, and
      the trigger signal is reduced with an upward movement of the wiper arm as a function of the wind load.

2. The windshield wiper mechanism according to claim 1, wherein:
   at least one of the wind load and a wiper speed is determined, and
   values of the wind load are one of stored in a memory and continuously recalculated.

3. The windshield wiper mechanism according to claim 2, wherein:
   a vehicle speed is obtained from a speedometer signal, and
   the wiper speed is determined from a signal picked off by at least one of a contact disk and a Hall-effect switch.

4. The windshield wiper mechanism according to claim 1, further comprising:
   a control stage for generating a correction signal; and
   a device for producing a manipulated variable signal and including one of a manipulated variable generator and a controller, wherein:
      the trigger signal is formed from the manipulated variable signal and from the correction signal.

5. The windshield wiper mechanism according claim 1, wherein:
   the trigger signal is a pulse-width modulated signal.

* * * * *